United States Patent
Charlton et al.

(10) Patent No.: US 12,340,071 B2
(45) Date of Patent: *Jun. 24, 2025

(54) USER INTERFACE FOR THIRD PARTY USE OF SOFTWARE DEVELOPMENT KIT

(71) Applicant: Snap Inc., Santa Monica, CA (US)

(72) Inventors: Ebony James Charlton, London (GB); Patrick Mandia, Venice, CA (US); Celia Nicole Mourkogiannis, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/605,349

(22) Filed: Mar. 14, 2024

(65) Prior Publication Data
US 2024/0220080 A1 Jul. 4, 2024

Related U.S. Application Data

(63) Continuation of application No. 18/109,715, filed on Feb. 14, 2023, now Pat. No. 11,972,090, which is a
(Continued)

(51) Int. Cl.
*G06F 3/0482* (2013.01)
*G06F 8/38* (2018.01)
(Continued)

(52) U.S. Cl.
CPC .............. *G06F 3/0482* (2013.01); *G06F 8/38* (2013.01); *G06F 9/451* (2018.02); *G06F 9/541* (2013.01);
(Continued)

(58) Field of Classification Search
CPC ............................................... G06F 3/048–05
See application file for complete search history.

(56) References Cited

U.S. PATENT DOCUMENTS 8,660,545 B1 * 2/2014 Redford ........... H04N 21/41265
455/418
9,268,464 B1 * 2/2016 Stadlen ............... G06F 16/9554
(Continued)

FOREIGN PATENT DOCUMENTS

CN 110457092 A 11/2019
CN 110460797 A 11/2019
(Continued)

OTHER PUBLICATIONS

Josh Constine, "Snapchat preps Snapkit platform to bring camera, login to other apps", published May 29, 2018, available at <<https://techcrunch.com/2018/05/29/snapchat-snapkit/>>, 6 pages (Year: 2018).*
(Continued)

*Primary Examiner* — Daniel Rodriguez
(74) *Attorney, Agent, or Firm* — Schwegman Lundberg & Woessner, P.A.

(57) ABSTRACT

A user interface method is provided on a portable device including a camera and a display. The method includes receiving a program call to display an image processing user interface and in response, displaying a first user interface comprising a list of selectable graphical items corresponding to a group of available image modification features. If user selection of a desired graphical item from the list of selectable graphical items is received, image modification features corresponding to the desired graphical item are applied to an image received from the camera, generating a modified image. A second user interface including the modified image and various further options is then displayed on the display.

17 Claims, 10 Drawing Sheets

Related U.S. Application Data continuation of application No. 17/302,432, filed on May 3, 2021, now Pat. No. 11,604,562.

(60) Provisional application No. 63/037,225, filed on Jun. 10, 2020.

(51) Int. Cl.
  *G06F 9/451* (2018.01)
  *G06F 9/54* (2006.01)
  *G06T 11/00* (2006.01)

(52) U.S. Cl.
  CPC ........ *G06T 11/00* (2013.01); *G06F 2209/547* (2013.01); *G06T 2200/24* (2013.01)

(56) References Cited

U.S. PATENT DOCUMENTS

| | | | |
|---|---|---|---|
| 9,465,682 B1* | 10/2016 | Powell | G06F 9/543 |
| 10,269,164 B1 | 4/2019 | Song et al. | |
| 11,201,981 B1* | 12/2021 | Suiter | G06Q 30/0639 |
| 11,604,562 B2 | 3/2023 | Charlton et al. | |
| 11,972,090 B2 | 4/2024 | Charlton et al. | |
| 2006/0195786 A1 | 8/2006 | Stoen et al. | |
| 2011/0258686 A1* | 10/2011 | Raj | G06Q 20/10 726/6 |
| 2013/0185642 A1 | 7/2013 | Gammons | |
| 2014/0071045 A1* | 3/2014 | Muchnick | G06T 11/60 345/156 |
| 2014/0095638 A1* | 4/2014 | Chen | H04L 51/04 709/206 |
| 2014/0214700 A1* | 7/2014 | Leach | G06F 3/04817 715/753 |
| 2015/0206349 A1* | 7/2015 | Rosenthal | G06T 19/006 345/633 |
| 2015/0237268 A1* | 8/2015 | Vaiaoga | H04N 23/90 348/218.1 |
| 2016/0085516 A1* | 3/2016 | Ben-Tzur | G06F 16/972 717/109 |
| 2016/0210626 A1* | 7/2016 | Ortiz | G06Q 20/023 |
| 2017/0004512 A1* | 1/2017 | Weider | H04W 4/14 |
| 2018/0088764 A1* | 3/2018 | Lu | G06F 3/0484 |
| 2018/0113609 A1* | 4/2018 | Gnedin | G06F 3/04886 |
| 2018/0143748 A1 | 5/2018 | Ahmed et al. | |
| 2018/0300185 A1* | 10/2018 | Smet | G06F 9/541 |
| 2018/0348966 A1* | 12/2018 | Scoville | H04L 51/52 |
| 2019/0116323 A1 | 4/2019 | Kim et al. | |
| 2020/0045245 A1* | 2/2020 | Van Os | H04N 23/611 |
| 2020/0220823 A1 | 7/2020 | Eirinberg et al. | |
| 2020/0306637 A1 | 10/2020 | Baldwin et al. | |
| 2020/0310601 A1 | 10/2020 | Anvaripour et al. | |
| 2020/0358728 A1 | 11/2020 | Andreou et al. | |
| 2020/0374249 A1 | 11/2020 | Wu et al. | |
| 2020/0387931 A1* | 12/2020 | Bastiyali | G09F 19/02 |
| 2021/0200390 A1 | 7/2021 | Luo et al. | |
| 2021/0224086 A1 | 7/2021 | Jensen et al. | |
| 2021/0298458 A1* | 9/2021 | Barron | G06F 3/04842 |
| 2021/0326780 A1* | 10/2021 | Liu | G06Q 30/0203 |
| 2021/0389850 A1 | 12/2021 | Charlton et al. | |
| 2021/0397390 A1* | 12/2021 | Li | G06F 3/126 |
| 2022/0206735 A1* | 6/2022 | Zhao | G09G 5/36 |
| 2022/0383836 A1* | 12/2022 | Wang | H04N 21/854 |
| 2023/0195281 A1 | 6/2023 | Charlton et al. | |

FOREIGN PATENT DOCUMENTS

| | | |
|---|---|---|
| CN | 110460799 A | 11/2019 |
| CN | 115698927 A | 2/2023 |
| KR | 20140143673 | 12/2014 |
| KR | 20170027136 A | 3/2017 |
| WO | WO-2021252216 A1 | 12/2021 |

OTHER PUBLICATIONS

James Peckham, "How to use Snapchat filters and lenses", published May 9, 2017, available at <<https://www.techradar.com/how-to/how-to-use-snapchat-filters-and-lenses>>, 5 pages (Year: 2017).*
Bruch Bookman, "Snapchat Snap Kit SDK Tutorial for iOS Swift", published Aug. 20, 2018, available at <<https://medium.com/adventures-in-ios-mobile-app-development/snapchat-snap-kit-sdk-tutorial-for-ios-swift-311863074bab>>, 17 pages (Year: 2018).*
Natalia Vasquez, "11 Examples of Branded Snapchat Filters & Lenses That Worked", published Jun. 16, 2016, available at <<https://medium.com/comms-planning/11-branded-snapchat-filters-that-worked-94a808afa682>>, 13 pages (Year: 2016).*
Kyle Lightning—Snap This!, "What is SnapKit? (3rd Party Development Tool)", published Mar. 10, 2019, available at <<https://www.youtube.com/watch?v=AZ9uWBNun8M&t=381s>>, 12 pages (Year: 2019).*
"U.S. Appl. No. 18/109,715, 312 Amendment mailed Mar. 15, 2024", 10 pgs.
"U.S. Appl. No. 18/109,715, PTO Response to Rule 312 Communication mailed Mar. 28, 2024", 3 pgs.
"Chinese Application Serial No. 202180041371.2, Request for Reexamination filed Apr. 25, 2024", w/ English claims, 17 pgs.
"European Application Serial No. 21822939.1, Extended European Search Report mailed May 15, 2024", 10 pgs.
U.S. Appl. No. 17/302,432, U.S. Pat. No. 11,604,562, filed May 3, 2021, Interface Carousel for Use With Image Processing Software Development Kit.
U.S. Appl. No. 18/109,715, filed Feb. 14, 2023, Interface Carousel for Use With Image Processing Software Development Kit.
"U.S. Appl. No. 17/302,432, Non Final Office Action mailed Aug. 3, 2022", 18 pgs.
"U.S. Appl. No. 17/302,432, Notice of Allowance mailed Nov. 16, 2022", 6 pgs.
"U.S. Appl. No. 17/302,432, Response filed Nov. 3, 2022 to Non Final Office Action mailed Aug. 3, 2022", 9 pgs.
"U.S. Appl. No. 18/109,715, Non Final Office Action mailed Aug. 24, 2023", 18 pgs.
"U.S. Appl. No. 18/109,715, Notice of Allowance mailed Dec. 18, 2023", 6 pgs.
"U.S. Appl. No. 18/109,715, Response filed Nov. 21, 2023 to Non Final Office Action mailed Aug. 24, 2023", 14 pgs.
"Chinese Application Serial No. 202180041371.2, Decision of Rejection mailed Jan. 25, 2024", w/ English Translation, 13 pgs.
"Chinese Application Serial No. 202180041371.2, Office Action mailed Jul. 27, 2023", w/ English Translation, 18 pgs.
"European Application Serial No. 21822939.1, Response filed Jul. 6, 2023 to Communication pursuant to Rules 161(2) and 162 EPC mailed Jan. 17, 2023", 15 pgs.
"International Application Serial No. PCT/US2021/035091, International Preliminary Report on Patentability mailed Dec. 22, 2022", 6 pgs.
"International Application Serial No. PCT/US2021/035091, International Search Report mailed Sep. 10, 2021", 4 pgs.
"International Application Serial No. PCT/US2021/035091, Written Opinion mailed Sep. 10, 2021", 4 pgs.
Bruch, Bookman, "Snapchat Snap Kit SDK Tutorial for iOS Swift", <https://medium.com/adventures-in-ios-mobile-app-development/snapchat-snap-kit-sdk-tutorial-for-ios-swift-311863074bab>, (2018), 17 pgs.
James, Peckham, "How to use Snapchat filters and lenses", <https://www.techradar.com/how-to/how-to-use-snapchat-filters-and-lenses>, (2017), 5 pgs.
Josh, Constine, "Snapchat preps Snapkit platform to bring camera, login to other apps", <https://techcrunch.com/2018/05/29/snapchat-snapkit/>, (2018), 6 pgs.
Kyle, Lightning, "What is SnapKit? (3rd Party Development Tool)", [Online]. Retrieved from the Internet: <https://www.youtube.com/watch?v=AZ9uWBNun8M&t=381>, (Mar. 10, 2019), 12 pgs.
Natalia, Vasquez, "11 Examples of Branded Snapchat Filters & Lenses That Worked", <https://medium.com/comms-planning/11-branded-snapchat-filters-that-worked-94a808afa682>, (2016), 13 pgs.

(56) References Cited

OTHER PUBLICATIONS

"Korean Application Serial No. 10-2023-7000745, Notice of Preliminary Rejection mailed Feb. 13, 2025", w/ English Translation, 14 pgs.

* cited by examiner

USER INTERFACE FOR THIRD PARTY USE OF SOFTWARE DEVELOPMENT KIT

CROSS REFERENCE TO RELATED APPLICATION

This application is a continuation of U.S. patent application Ser. No. 18/109,715, filed on Feb. 14, 2023, which is a continuation of U.S. patent application Ser. No. 17/302,432, filed on May 3, 2021, now issued as U.S. Pat. No. 11,604,562, which claims the benefit of U.S. Provisional Patent Application Ser. No. 63/037,225, filed on Jun. 10, 2020, the contents of all of which are incorporated herein by reference as if explicitly set forth.

BACKGROUND

With the increased use of digital images, affordability of portable computing devices, availability of increased capacity of digital storage media, and increased bandwidth and accessibility of network connections, digital images and video have become a part of daily life for an increasing number of people. Additionally, the expectation of device users is also that the experience of using apps on portable computing devices will continue to become more sophisticated and media-rich.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Embodiments are illustrated by way of example, and not limitation, in the figures of the accompanying drawings in which.

DETAILED DESCRIPTION

Figure 1:
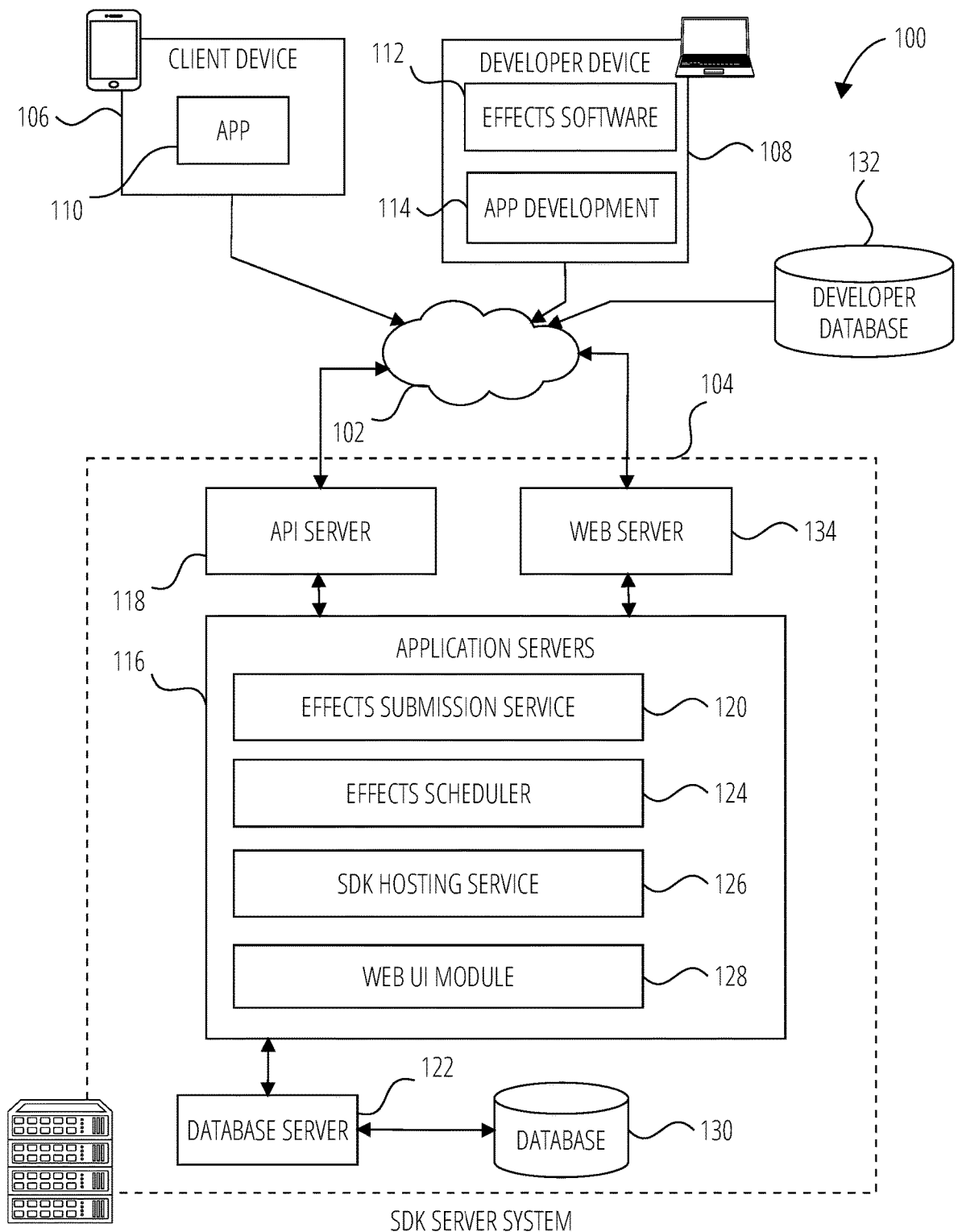
FIG. 1 is a diagrammatic representation of a networked environment in which the present disclosure may be deployed, in accordance with some examples.

Users with a range of interests and from various locations can capture digital images of various subjects and make captured images available to others via networks, such as the Internet. To enable computing devices to perform image processing or image enhancing operations on various objects and/or features captured in a wide range of changing conditions (e.g., changes in image scales, noises, lighting, movement, or geometric distortion) can be challenging and computationally intensive.

Additionally, third-party developers of apps for use on personal devices may want to provide enhanced visual effects but may not have the know-how or the budget to provide such effects in their apps. The original developers of systems and technology to support enhanced visual effects (SDK providers) can enable the use of such effects in apps released by third-party app developers, by providing a modular software development kit (SDK) as described in more detail below. As used herein, the term "third party developer," "app developer" and "developer" are not limited to actual developers as such, but include persons and entities that are hosting, providing or own the relevant software, app, SDK or service that may originally have been developed by others.

In some cases, the provider of the SDK also provides a messaging application including image modification capabilities as described herein. The SDK provides a third party access to such image modification capabilities to allow the third party to offer image modification features in their app independently of launching the SDK-provider's messaging application.

As discussed herein, the subject infrastructure supports the creation, viewing and/or sharing of interactive or enhanced two or three dimensional media in apps released by app developers. The subject system also supports the creation, storage and loading of external effects and asset data by a third party developer, for use by an app running on a client device.

As described herein, images, video or other media for enhancement can be captured from a live camera or can be retrieved from local or remote data storage. In one example, an image is rendered using the subject system to visualize the spatial detail/geometry of what the camera sees, in addition to a traditional image texture. When a viewer interacts with this image by moving the client device, the movement triggers corresponding changes in the perspective in which the image and geometry are rendered to the viewer.

As referred to herein, the phrase "augmented reality experience," includes or refers to various image processing operations corresponding to an image modification, filter, media overlay, transformation, and the like, as described further herein. In some examples, these image processing operations provide an interactive experience of a real-world environment, where objects, surfaces, backgrounds, lighting etc. in the real world are enhanced by computer-generated perceptual information. In this context an "augmented reality content generator" comprises the collection of data, parameters, and other assets needed to apply a selected augmented reality experience to an image or a video feed. In some examples, augmented reality content generators are provided by Snap, Inc. under the registered trademark LENSES.

In some examples, an augmented reality content generator includes augmented reality (or "AR") content configured to modify or transform image data presented within a GUI of a client device in some way. For example, complex additions or transformations to the content images may be performed using AR content generator data, such as adding rabbit ears to the head of a person in a video clip, adding floating hearts with background coloring to a video clip, altering the proportions of a person's features within a video clip, adding enhancements to landmarks in a scene being viewed on a client device or many numerous other such transformations. This includes both real-time modifications that modify an image as it is captured using a camera associated with the client device, which is then displayed on a screen of the client device with the AR content generator modifications, as well as modifications to stored content, such as video clips in a gallery that may be modified using AR content generators. For example, in a creator profile with multiple AR content generators, an authorized third party developer may use a single video clip with multiple AR content generators to see how the different AR content generators will modify the stored clip. Similarly, real-time video capture may be used with an AR content generator to show to a user of a client device on its display how video images currently being captured by sensors of a device would modify the captured data. Such data may simply be displayed on the screen and not stored in memory, the content captured by the device sensors may be recorded and stored in memory with or without the AR content generator modifications (or both), or the content captured by the device sensors may be transmitted, with the AR content generator modification, over the network 102 to a server or another client device.

AR content generators and associated systems and modules for modifying content using AR content generators may thus involve detection of objects (e.g. faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. For example, some examples may involve generating a 3D mesh model of the object or objects, and using transformations and animated textures of the model within the video to achieve the transformation. In other examples, tracking of points on an object may be used to place an image or texture, which may be two dimensional or three dimensional, at the tracked position. In still further examples, neural network analysis of video frames may be used to place images, models, or textures in content (e.g. images or frames of video). AR content generator data thus may include both the images, models, and textures used to create transformations in content, as well as additional modeling and analysis information needed to achieve such transformations with object detection, tracking, and placement.

In one aspect, a method of providing a user interface by a messaging application software development kit (SDK) included with a third party resource running on a portable device including a camera and a display, includes receiving, by the SDK, an API call to display an image processing user interface, displaying on the display of the portable device, a first user interface includes a list of selectable graphical items corresponding to a group of available image modification features, receiving user selection of a desired graphical item from the list of selectable graphical items, applying image modification features corresponding to the desired graphical item to an image received from the camera to generate a modified image, and displaying, on the display of the portable device, a second user interface including the modified image.

The first or the second user interface may include a logo related to a provider of the SDK. The second user interface may further include a text overlay including a name of a creator of the image modification features corresponding to the desired graphical item. The second user interface may further include a user interface element that is customizable by a developer of the third party resource and which, when selected, results in an action related to the third party resource or related to the developer of the third party resource.

A final item in the list of selectable graphical items may be a logo related to a provider of the SDK. The method may also include receiving user selection of the logo, and opening a messaging application provided by the provider of the SDK. The messaging application may either be opened to a user interface in which the image modification features corresponding to the desired graphical item are active or to a profile specified by the third party resource.

The method may also include further includes receiving user selection of the logo, and opening a messaging application that is provided by a provider of the SDK to a user interface with additional image modification features that are available for selection by a user.

In one aspect, a system includes one or more processors of a machine, a camera and a display. The system also includes a memory storing instructions, including an SDK included with a third party software application, that when executed by at least one processor among the one or more processors, causes the machine to perform operations includes receiving an API call by the SDK to display an image processing user interface, displaying on the display, a first user interface includes a list of selectable graphical items corresponding to a group of available image modification features, receiving user selection of a desired graphical item from the list of selectable graphical items, applying image modification features, by the SDK, corresponding to the desired graphical item to an image received from the camera to generate a modified image, and displaying, on the display, a second user interface including the modified image.

The first or the second user interface may include a logo related to a provider of the SDK. The second user interface may further include a text overlay including a name of a creator of the image modification features corresponding to the desired graphical item. The second user interface may further include a user interface element that is customizable by a developer of the third party resource and which, when selected, results in an action related to the third party resource or related to the developer of the third party resource.

A final item in the list of selectable graphical items may be a logo related to a provider of the SDK. The method may also include receiving user selection of the logo, and opening a messaging application provided by the provider of the SDK. The messaging application may either be opened to a user interface in which the image modification features corresponding to the desired graphical item are active or to a profile specified by the third party resource.

The operations may further comprise receiving user selection of the logo, and opening a messaging application that is provided by a provider of the SDK. The messaging application may either be opened to a user interface in which the image modification features corresponding to the desired graphical item are active or to a profile specified by the third party software application. The operations may further comprise receiving user selection of the logo, and opening a messaging application that is provided by the provider of the SDK to a user interface with additional image modification features that are available for selection by a user.

In one aspect, a non-transitory machine-readable storage medium embodies instructions including an SDK included with a third party resource that, when executed by a portable device including a camera and a display, cause the portable device to perform operations including receiving an API call by the SDK to display an image processing user interface, displaying on the display of the portable device, a first user interface includes a list of selectable graphical items corresponding to a group of available image modification features, receiving user selection of a desired graphical item from the list of selectable graphical items, applying image modification features, by the SDK, corresponding to the desired graphical item to an image received from the camera to generate a modified image, and displaying, on the display of the portable device, a second user interface including the modified image.

The first or the second user interface may include a logo related to a provider of the SDK. The second user interface may further include a text overlay including a name of a creator of the image modification features corresponding to the desired graphical item. The second user interface may further include a user interface element that is customizable by a developer of the third party resource and which, when selected, results in an action related to the third party resource or related to the developer of the third party resource.

A final item in the list of selectable graphical items may be a logo related to a provider of the SDK. The method may also include receiving user selection of the logo, and opening a messaging application provided by the provider of the SDK. The messaging application may either be opened to a user interface in which the image modification features corresponding to the desired graphical item are active or to a profile specified by the third party resource.

The operations may further comprise receiving user selection of the logo, and opening a messaging application that is provided by a provider of the SDK. The messaging application may either be opened to a user interface in which the image modification features corresponding to the desired graphical item are active or to a profile specified by the third party software application. The operations may further comprise receiving user selection of the logo, and opening a messaging application that is provided by the provider of the SDK to a user interface with additional image modification features that are available for selection by a user.

Other technical features may be readily apparent to one skilled in the art from the following figures, descriptions, and claims.

FIG. 1 is a block diagram showing an example system 100 for exchanging data (e.g., messages, AR content generators, media and associated content) over a network. The system 100 includes multiple instances of a client device 106, each of which hosts a number of applications, including an app 110. Each client device 106 may be communicatively coupled to other client devices 106 also running instances of the app 110, an SDK server system 104 and a developer database 132, via a network 102 (e.g., the Internet). The client device may also be coupled via the network to an app store from which the app 110 can be downloaded and installed on the client device 106. The app 110 may be any kind of app that might be running on the client device 106. It may but need not be, the type of app that is not traditionally associated with augmented reality (AR) interactivity or effects (such as messaging or social networking apps).

The app 110 is able to communicate and exchange data with another app 110 and with the SDK server system 104 via the network 102. The data exchanged between apps 110 depends on the particular app and is defined by the developer of the app, and may include text, audio, video or other multimedia data that may or may not have been modified using the systems and methods described herein. Information exchanged between an app 110 and the SDK server system 104 may include functions or commands to invoke functions, payload data (e.g., text, audio, video or other multimedia data as well as augmented reality content generator data) and performance or usage metrics. The data exchanged between the app 110 and the developer database 132 includes any data that is specific to or required by the particular app 110, or is data that is specific to the user of the app and that is hosted by or for the app developer.

The system also may include a developer device 108 that hosts effects software 112 that can be used by a developer to create custom AR content generators for use with the app 110. The effects software 112 may be provided by the SDK provider as downloadable software or a cloud service via the SDK server system 104. The developer device 108 may also include app development software 114 or be used to access an app development platform for use by the developer in developing app 110.

The SDK server system 104 includes application programming interfaces (APIs) with functions that can be called or invoked by the app 110 or the effects software 112. In certain examples, the SDK server system 104 includes a JavaScript library that provides a third party developer access to certain features and assets of the SDK server system 104, but applications and resources based on other technologies can be used.

In order to integrate the functions of the SDK (see further FIG. 2 and associated description of SDK 216) into an app 110, the SDK is downloaded by developer device 108 from the SDK server system 104 or is otherwise received by the developer device 108. Once downloaded or received, the SDK is included as part of the application code of the app 110. The code of the app 110 that is created by the developer can then call or invoke certain functions of the SDK to integrate image processing technology and features traditionally provided in apps released by the SDK provider.

The SDK server system 104 also provides server-side functionality via the network 102 to a particular app 110 and to the effects software 112 hosted on the developer device 108. While certain functions of the system 100 are described herein as being performed by either an app 110, the SDK server system 104 or the effects software 112, the location of certain functionality either within the app 110, the SDK server system 104 or the effects software 112 may be a design choice. For example, it may be technically preferable to initially deploy certain technology and functionality within the SDK server system 104 but to later migrate this technology and functionality to the app 110 when a client device 106 has sufficient processing capacity. Similarly, functionality provided by effects software 112 may be hosted as a web or cloud service by the SDK server system 104.

The SDK server system 104 supports various services and operations that are provided to the app 110, the effects software 112 and the app development software 114 as will be described in more detail below. Such operations include transmitting data to, receiving data from, and processing data generated by the effects software 112, hosting of the modular SDK for use by the developer in conjunction with the app development software 114, and the provision of AR content generators for use by the app 110. The SDK, when integrated with an app developed by a third party developer, provides all the core functions needed to download, cache, and execute AR content generators built with the effects software 112. Data exchanges within the system 100 are invoked and controlled through functions available via user interfaces (UIs) of the app 110 and the effects software 112.

Turning now specifically to the SDK server system 104, an Application Program Interface (API) server 118 is coupled to, and provides a programmatic interface to, application servers 116. The application servers 116 are communicatively coupled to a database server 122, which facilitates access to a database 130 that stores data associated with functions by the application servers 116. Similarly, a web server 134 is coupled to the application servers 116, and provides web-based interfaces to the application servers 116. To this end, the web server 134 processes incoming network requests over the Hypertext Transfer Protocol (HTTP) and several other related protocols.

The Application Program Interface (API) server 118 receives and transmits data (e.g., commands and other payloads, e.g. AR content generators and associated metadata) between the client device 106 and the application servers 116 and between the developer device 108 and the application servers 116. Specifically, the Application Program Interface (API) server 118 provides a set of interfaces (e.g., routines and protocols) that can be called or queried in order to invoke functionality of the application servers 116. The Application Program Interface (API) server 118 exposes various functions supported by the application servers 116 as described in more detail below.

The application servers 116 host a number of server applications and subsystems, including for example an effects submission service 120, an effects scheduler 124, an SDK hosting service 126 and a web UI module 128. The effects submission service 120 implements a number of technologies and functions, particularly related to the aggregation, storage of and access to AR content generators for visual effects that have been generated by a developer on the developer device 108 using the effects software 112. As will be described in further detail, the AR content generators generated by developers may be uploaded from the developer device 108 to the SDK server system 104 where they are aggregated by the effects submission service 120 into collections of AR content generators, associated with individual developers and stored in database 130. These collections are then made available to the app 110 as specified by the effects scheduler 124.

The application servers 116 also include an effects scheduler 124, which is an administrative tool that can be used by developers to manage their AR content generators. The effects scheduler 124 is accessed via a web-based interface, provided by web UI module 128, for managing AR content generators and associated metadata. The metadata associated with each AR content generator may include an AR content generator ID (a unique identifier used for all transactions involving the AR content generator), a public AR content generator name, an AR content generator icon image, any preview media, visibility settings, preferred activation camera (e.g. front or rear-facing camera) and the date the AR content generator was last submitted through the effects software 112. The associated metadata may also for example specify visibility (i.e. is the AR content generator public or private, or on or off), a "Start date" and "End date" to limit any AR content generator availability within a group, as well as advanced scheduling options, e.g. recurring times (daily, weekly, monthly, yearly). The associated metadata may also for example specify geofencing limitations, so that an AR content generator is only available in certain locations.

The web interface for accessing the effects scheduler 124 provides various views to a developer, including a view that has master list of all of the AR content generators associated with the developer, as well as group views, in which AR content generators in developer-defined groups will be listed. Only AR content generators created or owned by a particular developer will appear in the list of AR content generators shown when that developer accesses the effects scheduler 124. Each developer and their apps 110 are registered under an organization name in an SDK portal (not shown) by which the developer registers with the SDK server system 104.

To provide additional flexibility for development of use cases by the developer, the effects scheduler 124 also provides the ability to add developer data to each AR content generator or group of AR content generators, which can augment use of the AR content generator by the app 110. All developer data included in the AR content generator metadata are provided to the client device 106 for use by the app 110. This developer data could for example include search keywords, premium entitlements, additional UI guidance, or other visibility tags (e.g. "it's the birthday LENS"). This developer data is primarily intended for use in interactions between the user of the client device 106 and the apps 110. Although not out of the question, in one example neither the effects scheduler 124 nor the SDK 216 operates on this data.

AR content generator groups provide a way for AR content generators to be collected into ordered lists for delivery to an app 110, which will normally be presented visually by the app 110 to a user as will be described in more detail below. Since AR content generators are delivered to the app 110 in groups, for an AR content generator to appear in the app it needs to be associated with a group. Groups may be created and defined by the developer based on use cases, for example named "Los Angeles" and "Tokyo" for setting up different content at different locations. Each group has a specific group ID that can be used for group management.

The effects scheduler 124 provides an interface for creating and deleting groups, adding or removing AR content generators from individual groups and for applying additional developer data to all the AR content generators associated with a developer (global metadata), to groups of AR content generators (group metadata) and to an individual AR content generator, either directly to an AR content generator or when adding an AR content generator to a group. The global, group and individual AR content generator metadata are nested within separate keys in the metadata so the app 110 can choose to override metadata in one level with metadata in another level. The app 110 can either use or present a group of AR content generators as-is or filter the group of AR content generators based on any of the metadata associated with the AR content generators.

The effects scheduler 124 also receives performance and usage data from the app 110. This can relate both to performance of the SDK (e.g. statistics on tracking, rendering, AR content generator initialization and teardown times, etc.) and to usage metrics for the AR content generators themselves (e.g. which AR content generators were used, when and for how long, events in the app triggered during AR content generator usage.) This performance and usage data, as well as analytics derived, therefrom can be provided to a developer in a performance and metrics dashboard generated by the effects scheduler 124.

The web UI module 128 supports various functions and services and makes these functions and services available to the third party developer directly and/or to the effects software 112.

The SDK hosting service 126 provides developer access to the SDK (described in more detail below with reference to FIG. 2), including any updates or patches, and any associated SDK documentation.

In use of the system 100, a developer, after registering with the SDK portal, downloads the SDK from the SDK hosting service 126 for use in developing the app 110. The SDK provides all the core functions needed to download, cache, and execute AR content generators built with the effects software 112. The developer integrates the SDK into their app 110 using the app development software 114. The app 110 is then made available for download by users via known means, for example via an app store.

The developer also generates AR content generators using the effects software 112, which are then uploaded to the SDK server system 104 via the effects submission service 120, where they are aggregated by the effects submission service 120 into a collections of AR content generators associated with the developer and stored in database 130. The developer can then manage the collection of AR content generators using the effects scheduler 124 as discussed above, to group AR content generators and to manage AR content generator metadata. A group of AR content generators can then be downloaded to the client device 106 for use by the app 110, either in response to a user prompt provided in the app 110, by inclusion in an update of the app 110 or pushed from the SDK server system 104 in response to an instruction from the developer. Additionally, the app 110 may include an AR content generator or one or more groups of AR content generators when originally downloaded, e.g. from an app store.

Figure 2:
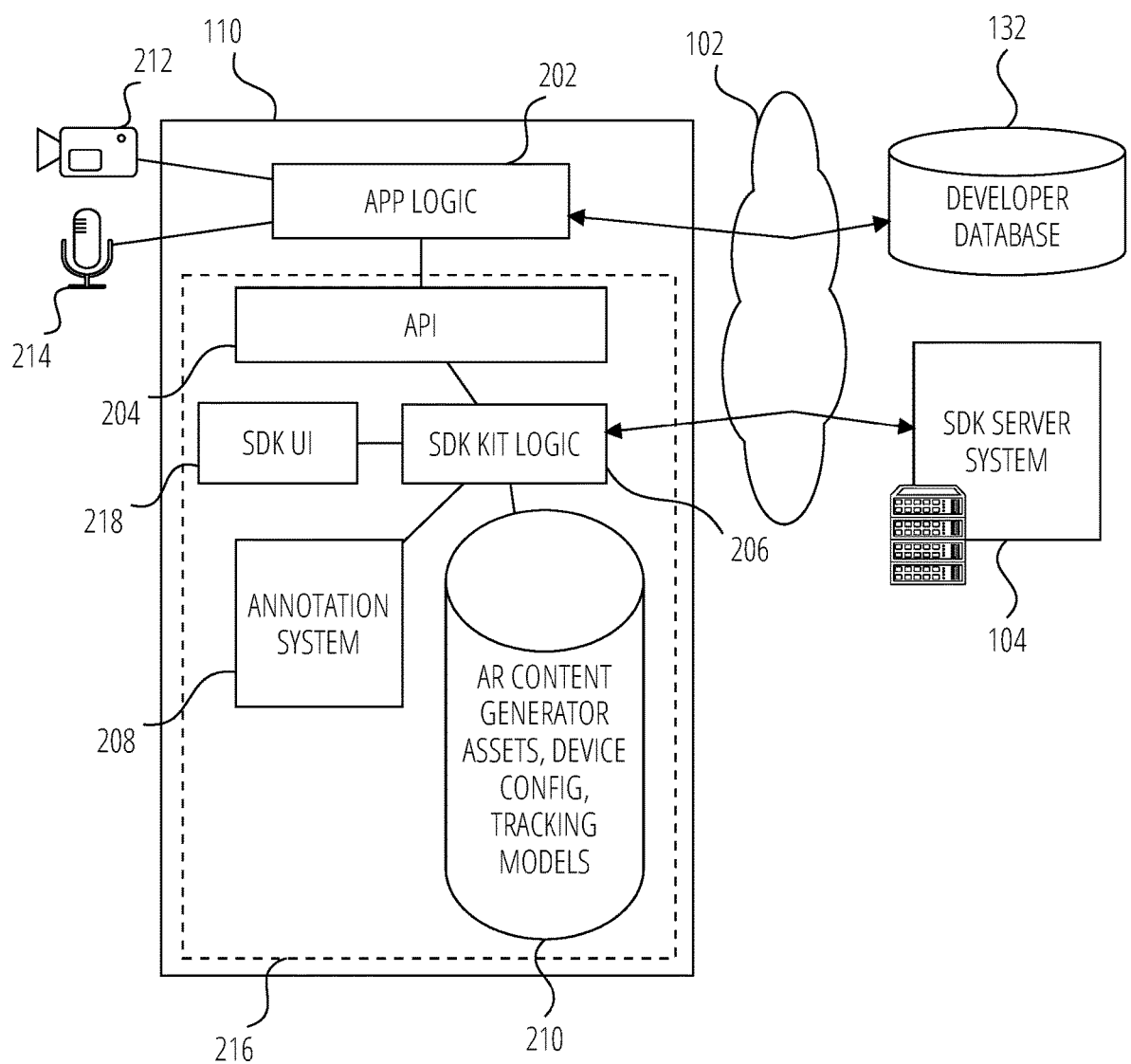
FIG. 2 is a diagrammatic representation of the architecture of the app illustrated in FIG. 1, and its relationship to the developer database and SDK server system of FIG. 1.

FIG. 2 shows the architecture of app 110 of FIG. 1. and its relationship to the developer database 132 and the SDK server system 104 of FIG. 1. As can be seen from the figure, the app 110 includes app logic 202 and SDK 216 comprising an API 204, SDK kit logic 206, annotation system 208, SDK UI 218 and local data storage 210.

The app logic 202 is developer-specific and provides the functionality and user interface expected by a user of the app 110. The app logic 202 defines and presents all visible interactive UI elements to the user of the client device 106 when the app 110 is running but the SDK 216 has not been called. The app logic 202 receives input from user input components 928 including for example a touch screen, camera 212 and microphone 214. The app logic 202 communicates with developer database 132 and/or any other required information resource required for regular operation of the app 110, over network 102. The app logic 202 also provides the SDK 216 with access to the camera 212 and the microphone 214.

The app logic 202 interacts with the SDK 216 via calls provided to the API 204. Examples of such calls may be to get an AR content generator group, get AR content generator metadata for an AR content generator in the group, and prefetch AR content generators for caching. As far as obtaining an AR content generator group, an AR content generator or any additional AR content generator assets are concerned, "downloading" generally refers to download on demand. If something is needed but it is not available in local data storage 210, it will be downloaded. "Prefetching" is predictively downloading an asset that is not available in local data storage 210 before it is needed, based on expected or likely interactions of the user with the app 110 or client device. "Caching" refers to the storage in local data storage 210 of all assets being downloaded or prefetched, which means that they are immediately available and also that the corresponding AR content generator can be used offline.

The SDK 216 receives calls and parameters from the app logic 202 and based thereon receives and augments the feed from the camera 212 in one example. The camera feed is processed by the SDK 216 as described in more detail below, and the rendered experience is composited into the return video feed for output and display on the client device 106. In another example, based on calls and parameters received from the app logic 202, the SDK 216 augments one or more image or video files stored on or received by client device 106.

The API 204 is the integrating link between the app logic 202 and the SDK 216, to permit the app logic 202 to access the features and services provided by the SDK 216. The API 204 receives commands and parameters (for example, get an AR content generator group, get AR content generator metadata for an AR content generator in the group, prefetch AR content generators for caching, apply an AR content generator with a certain AR content generator ID, user inputs, AR content generator parameters etc.) from the app logic 202 and translates them appropriately for provision to the SDK kit logic 206.

The SDK kit logic 206 can communicate with the SDK server system 104 over the network 102 to receive or request appropriate AR content generator assets (one or more groups of AR content generators and associate metadata) from the SDK server system 104 for storage in the local data storage 210. SDK kit logic 206 also provides performance and usage data from the client device 106 to SDK server system 104 as described above. The SDK kit logic 206 also handles authentication between the client device 106 and SDK server system 104 for such purposes, and calls the correct endpoints to fetch AR content generator groups and associated metadata.

SDK kit logic 206 is also responsible for coordinating the interaction between the API 204, the annotation system 208 and the local data storage 210. In one example, the SDK kit logic 206 receives translated commands and parameters from the API 204 and provides appropriate AR content generator assets (a specified AR content generator and associate metadata), device configuration and tracking models (e.g. algorithms and parameters for performing image homography on an image sequence to detect and track objects in the feed from the camera 212) from the local data storage 210 to the annotation system 208. The SDK kit logic 206 also provides translated or otherwise appropriate instructions to the annotation system 208 based on commands or gesture inputs from the user (e.g. touches, swipes, double taps etc.) received from the API 204.

The annotation system 208 is responsible for processing the camera feed based on a selected AR content generator and its metadata, the configuration of the device, specified tracking models, user input and sensor (e.g. positional sensor data) or other data received from or via the app logic 202 or directly from components making up the client device 106 such as the camera 212 or microphone 214. For example, in some cases the annotation system 208 tracks objects based on the components or parameters within the AR content generator. Examples include face tracking (including monitoring facial action triggers like open mouth, raise eyebrows etc.), surface tracking, pet tracking, etc. The annotation system 208 also renders assets in the AR content generator and processes any JavaScript within the AR content generator package to execute any logic contained within the AR content generator (e.g. moving of objects, modifying colors, etc.) The annotation system 208 is described in more detail below with reference to FIG. 3.

The SDK UI 218 is responsible for, in cooperation with the SDK kit logic 206, presenting the user interface elements that are displayed when the SDK 216 has been called. The SDK UI 218 receives relevant data, such as user interactions, from SDK kit logic 206 and passes appropriate responses back to SDK kit logic 206.

The SDK UI 218 causes display of selectable graphical items that, in an example, are presented in a carousel arrangement, as described and illustrated below with reference to FIGS. 3 to 8. By way of example, the user can utilize various inputs to rotate the selectable graphical items onto and off of the display screen in manner corresponding to a carousel, thereby providing a cyclic view of the graphical items. The carousel arrangement allows multiple graphical items to occupy a particular graphical area on the display screen. In an example, AR content generators can be organized into groups for including on the carousel arrangement, thereby enabling rotation through AR content generators by group.

The local data storage 210 is a repository for device configuration information, tracking models and AR content generator assets. If the device configuration information and tracking models are not included in the SDK 216 as part of the app 110 originally, these can be downloaded from the SDK server system 104 by the SDK kit logic 206. Device configuration information specifies how the application of an AR content generator by the SDK 216 may vary based on the actual configuration of the client device 106.

Figure 3:
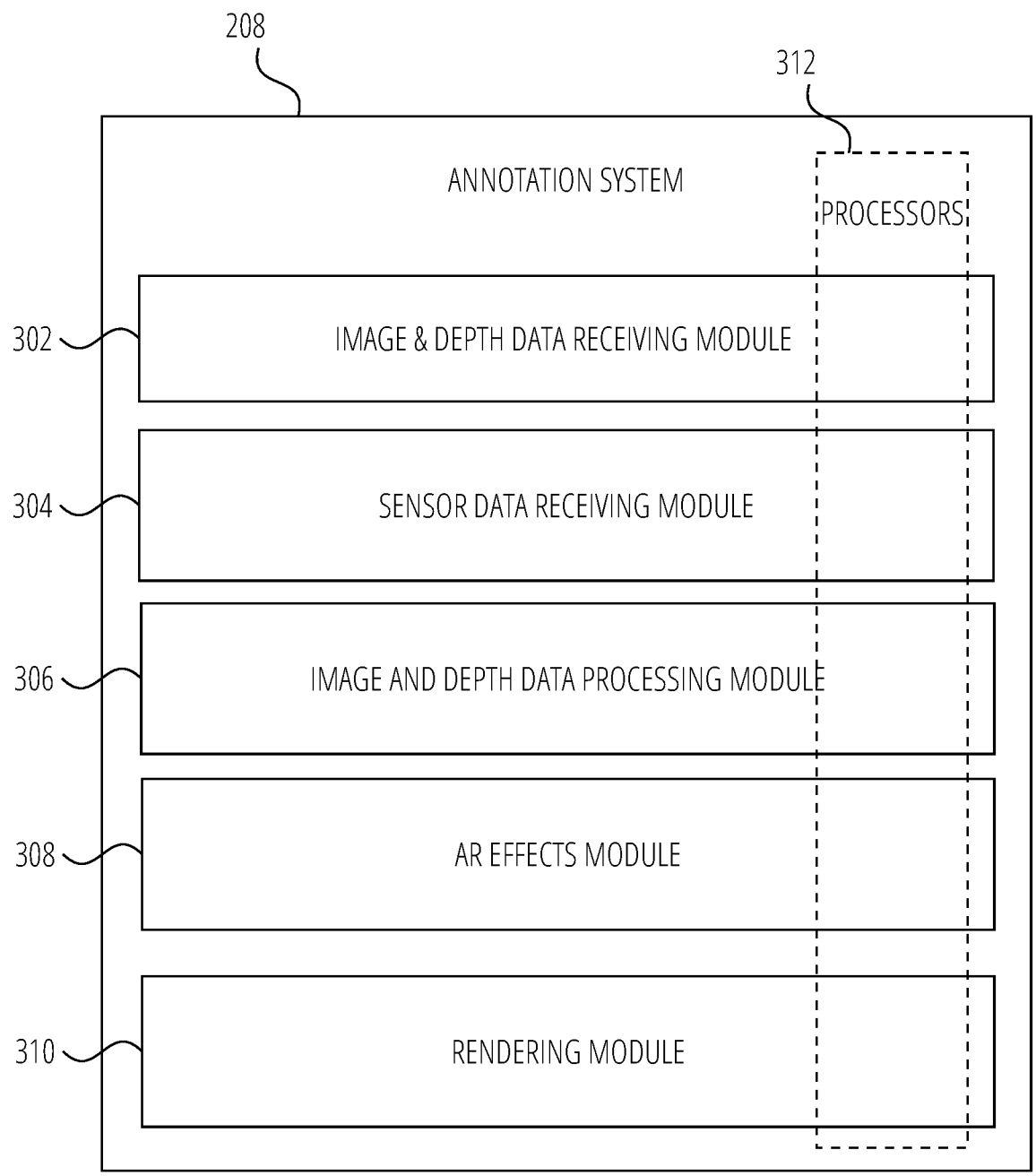
FIG. 3 is a block diagram illustrating various modules of the annotation system of FIG. 2

FIG. 3 is a block diagram illustrating various modules of an annotation system 208, according to certain example examples. The annotation system 208 is shown as including an image and depth data receiving module 302, a sensor data receiving module 304, an image and depth data processing module 306, an AR effects module 308, and a rendering module 310. The various modules of the annotation system 208 are configured to communicate with each other (e.g., via a bus, shared memory, or a switch). Any one or more of these modules may be implemented using one or more computer processors 312 (e.g., a set of processors provided by the client device 106).

Any one or more of the modules described may be implemented using hardware alone (e.g., one or more of the computer processors 904 of a machine (e.g., machine 900) or a combination of hardware and software. For example, any described module of the annotation system 208 may physically include an arrangement of one or more of the computer processors 312 (e.g., a subset of or among the one or more computer processors of the machine (e.g., machine 900) configured to perform the operations described herein for that module. As another example, any module of the annotation system 208 may include software, hardware, or both, that configure an arrangement of one or more computer processors 312 (e.g., among the one or more computer processors of the machine (e.g., machine 900) to perform the operations described herein for that module. Accordingly, different modules of the annotation system 208 may include and configure different arrangements of such computer processors 312 or a single arrangement of such computer processors 312 at different points in time. Moreover, any two or more modules of the annotation system 208 may be combined into a single module, and the functions described herein for a single module may be subdivided among multiple modules. Furthermore, according to various examples, modules described herein as being implemented within a single machine, database, or device may be distributed across multiple machines, databases, or devices.

The image and depth data receiving module 302 in one example receives images and depth data captured by a client device 106. For example, an image may be a frame captured by an optical sensor (e.g., camera) of the client device 106. An image may include one or more real-world features, such as a user's face or real-world object(s) detected in the image. In some examples, an image includes metadata describing the image. For example, the depth data may include data corresponding to a depth map including depth information based on light rays emitted from a light emitting module directed to an object (e.g., a user's face) having features with different depths (e.g., eyes, ears, nose, lips, etc.). By way of example, a depth map is similar to an image but instead of each pixel providing a color, the depth map indicates distance from a camera to that part of the image (e.g., in absolute terms, or relative to other pixels in the depth map).

The sensor data receiving module 304 receives sensor data from a client device 106. Sensor data is any type of data captured by a sensor of the client device 106. In an example, sensor data can include motion of the client device 106 gathered by a gyroscope, touch inputs or gesture inputs from a touch sensor (e.g., touchscreen), GPS, or another sensor of the client device 106 that describes a current geographic location and/or movement of the client device 106. As another example, sensor data may include temperature data indicating a current temperature as detected by a sensor of the client device 106. As another example, the sensor data may include light sensor data indicating whether the client device 106 is in a dark or bright environment.

The image and depth data processing module 306 performs operations on the received image and/or depth data. Various image processing and/or depth processing operations may be performed by the image and depth data processing module 306. For example, the image and depth data processing module 306 provides the ability to track the different objects supported by the effects software 112, including faces, pets, hands, bodies, skeletal joints, landmarkers (i.e. physical landmarks that can be recognized by the annotation system 208 and to which AR content generators can be applied for landmark-specific effects) and image markers (i.e. specific images that can be recognized by the annotation system 208.) Some of these features may require additional device data, which will be requested from the app logic 202 by the API 204 with appropriate user permission requests for protected device data like gyro, compass, and location information.

To optimize tracking, each client device 106 device has its own configuration profile and associated tracking models, optimized per device, for tracking different objects. The SDK kit logic 206 will request these if and as needed from the SDK server system 104.

The AR effects module 308 performs various operations based on algorithms or techniques that correspond to animations and/or providing visual and/or auditory effects to the received image and/or depth data. In an example, a given image can be processed be processed by the AR effects module 308 to perform operations to render AR effects (e.g., including 2D effects or 3D effects using depth data) and the like, as specified by a selected AR content generator.

The rendering module 310 performs rendering of the image for display by the client device 106 based on data provided by at least one of the aforementioned modules. In an example, the rendering module 310 utilizes a graphical processing pipeline to perform graphical operations to render the image for display. The rendering module 310 implements, in an example, an extensible rendering engine that supports multiple image processing operations corresponding to respective AR content generators.

In some implementations, the rendering module 310 provide a graphics system that renders two-dimensional (2D) objects or objects from a three-dimensional (3D) world (real or imaginary) onto a 2D display screen. Such a graphics system (e.g., one included on the client device 106) includes a graphics processing unit (GPU) in some implementations for performing image processing operations and rendering graphical elements for display.

In an implementation, the GPU includes a logical graphical processing pipeline, which can receive a representation of a 2D or 3D scene and provide an output of a bitmap that represents a 2D image for display. Existing application programming interfaces (APIs) have implemented graphical pipeline models. Examples of such APIs include the Open Graphics Library (OPENGL) API and the METAL API. The graphical processing pipeline includes a number of stages to convert a group of vertices, textures, buffers, and state information into an image frame on the screen. In an implementation, one of the stages of the graphical processing pipeline is a shader, which may be utilized as part of a particular AR content generator that is applied to an input frame (e.g., a still image or video frame). A shader can be implemented as code running on a specialized processing unit, also referred to as a shader unit or shader processor, usually executing several computing threads, programmed to generate appropriate levels of color and/or special effects to fragments being rendered. For example, a vertex shader processes attributes (position, texture coordinates, color, etc.) of a vertex, and a pixel shader processes attributes (texture values, color, z-depth and alpha value) of a pixel. In some instances, a pixel shader is referred to as a fragment shader.

It is to be appreciated that other types of shader processes may be provided. In an example, a particular sampling rate is utilized, within the graphical processing pipeline, for rendering an entire frame, and/or pixel shading is performed at a particular per-pixel rate. In this manner, a given electronic device (e.g., the client device 106) operates the graphical processing pipeline to convert information corresponding to objects into a bitmap that can be displayed by the electronic device.

A 3D model of the subject or scene may also be obtained or generated for use by the examples described herein, for example by the image and depth data processing module 306 performing homography on the image stream received from the camera 212. In some examples, an existing 3D model of a location may be downloaded from a server based on the location of the client device as reported by position components 936. Such a 3D model can be combined with an AR content generator(s) within the subject system, offering additional elements of interactivity for the user of the app 110.

In some examples, by using depth and image data, 3D face and scene reconstruction can be performed that adds a Z-axis dimension (e.g., depth dimension) to a traditional 2D photos (e.g., X-axis and Y-axis dimensions). This format enables the viewer to interact with the image, changing the angle/perspective in which the image is rendered by the subject system, and affecting particles and shaders that are utilized in rendering the image.

In one example, viewer interaction input comes from movement (e.g., from a movement sensor of the device displaying the image to the viewer) whilst viewing the image which in turn is translated to changes in perspective for how content, particles and shaders are rendered. Interaction can also come from onscreen touch gestures and other device motion.

Figure 4:
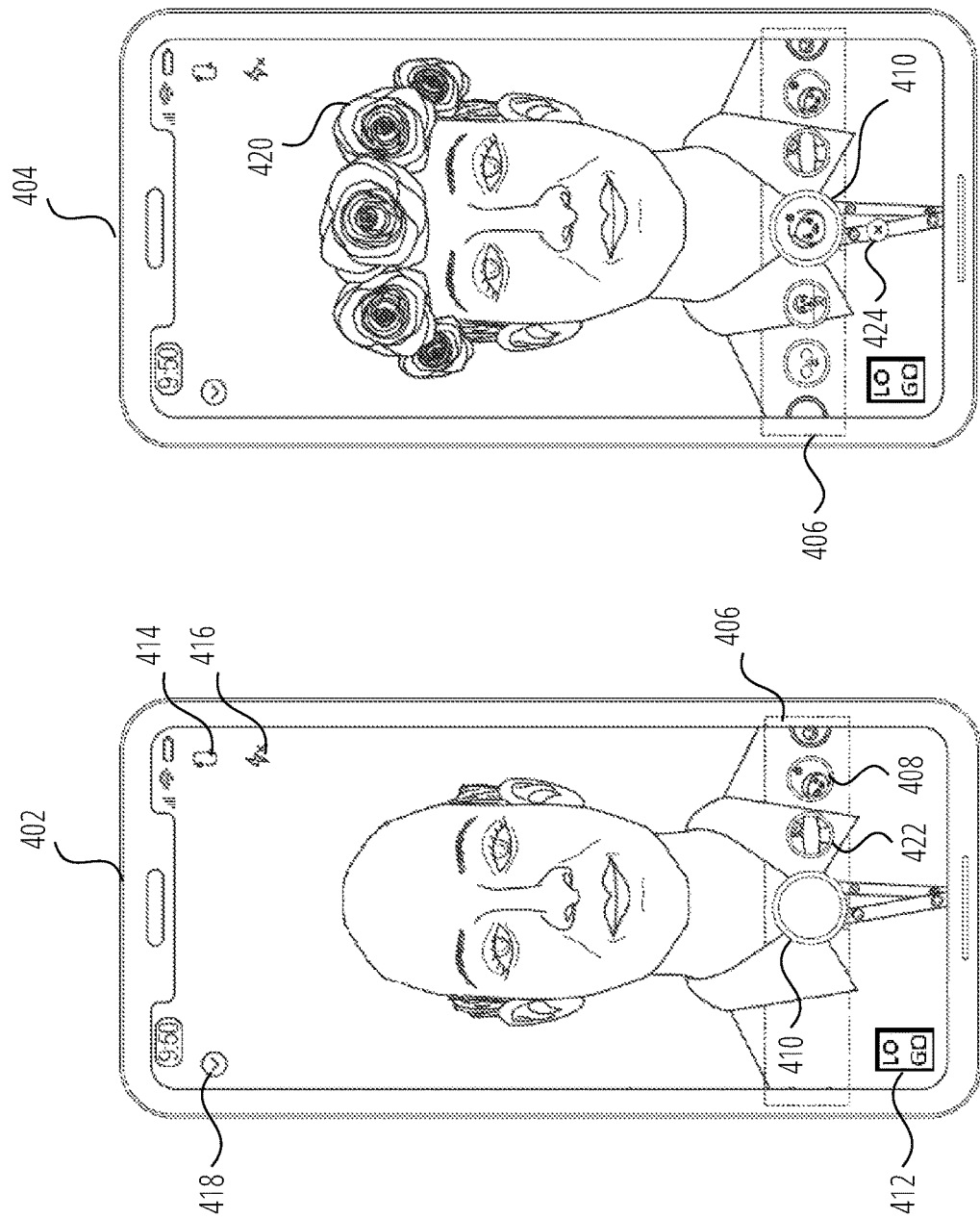
FIG. 4 shows example user interfaces depicting a carousel for selecting and applying AR content generator data to media content.

FIG. 4 illustrates example user interfaces depicting a carousel for selecting and applying selected AR content generator data to media content (e.g., an image or video generated by the camera 212), and presenting the results of the applied AR content generator in the app 110, according to some examples.

In examples of such user interfaces, selectable graphical items, such as AR content generator icon 408, AR content generator icon 422 etc. may be presented in a carousel arrangement in which a portion or subset of the selectable graphical items are visible on a display screen of a given computing device (e.g., the client device 106). By way of example, the user can utilize various inputs to rotate the selectable graphical items in the carousel arrangement onto and off of the display screen, providing a cyclic view of the graphical items. The carousel arrangement as provided in the user interfaces therefore allow multiple graphical items to occupy a particular graphical area on the display screen.

In an example, respective AR or image modification experiences corresponding to different AR content generators can be organized into respective groups for including on the carousel arrangement thereby enabling the user to scroll or "rotate" through available AR content generators. Although a carousel interface is provided as an example, it is appreciated that other graphical interfaces may be utilized. For example, the AR content generator icons may be shown in a graphical list, scroll list, scroll graphic, or another graphical interface that enables navigation and/or selection. As used herein, a carousel interface refers to display of graphical items in an arrangement similar to a circular list, thereby enabling navigation, based on user inputs (e.g., touch or gestures), through the circular list to select or scroll through the graphical items. In an example, a set of graphical items may be presented on a horizontal (or vertical) line or axis where each graphical item is represented as a particular thumbnail image (or icon, avatar, and the like).

At any one time, some of the graphical items in the carousel interface may be hidden. If the user wants to view the hidden graphical items, in an example, the user may provide a user input (e.g., swipe or other touch gesture, and the like) to scroll through the graphical items in a particular direction (e.g., left, right, up, or down, and the like). In response to the user input, an updated view of the carousel interface is displayed via an animation that presents one or more additional graphical items for inclusion on the interface, and in which some of the previously presented graphical items may be hidden. In one example, in this manner the user can navigate through the set of graphical items back and forth in a circular fashion. Thus, it is appreciated that the carousel interface can optimize screen space by displaying only a subset of graphical items from a set of graphical items, in a scrollable view. In some cases the carousel is continuous (graphical items leaving one side are able to re-enter the other side) or has defined beginning and end points (there are first and last graphical elements beyond which the carousel will not scroll.)

As described herein, AR content generator icons are included on the carousel arrangement (or another interface as discussed above) thereby enabling rotation through and selection of one of the AR content generators. As discussed in more detail above, the AR content generator icons shown in the carousel arrangement correspond to a group of available AR content generators that has been curated and filtered according to metadata, which may define times or places of AR content generator availability. In the carousel arrangement of the user interface examples of FIG. 4, the AR content generator icons shown in the carousel arrangement are from the available AR content generators provided by the app 110.

As illustrated in user interfaces shown in FIG. 4, selectable AR content generator icons 408 and 422 are displayed in a carousel 406 on the display screen of an electronic device (e.g., the client device 106). In one example, a left or right swipe gesture is received along the carousel 406 via a touch screen of the client device 106, and in response to receiving the swipe gesture, left or right movement of the items in the carousel is enabled to facilitate selection of a particular AR content generator corresponding to one of the AR content generator icons 408, 422. The desired AR content generator icon (e.g. AR content generator icon 408) is then selected either via a touch input by the user over the AR content generator icon of interest, or by scrolling through the carousel and stopping when the desired AR content generator icon is located in the central position 410, as can be seen in user interface 404. Carousel parameters can also be defined by the provider of the SDK and/or the developer of the app. For example, it may be specified that the maximum number of AR content generator icons in a carousel is a certain number, for example 25.

The user interface 402 corresponds to an initial screen that is shown in response to a call to the SDK 216 by the app logic 202 in which an AR content generator is not active, as can be seen by the lack of an AR content generator icon in the central position 410. That is, the view of the user captured by the camera 212 and displayed on the display screen of the client device 106 is unadorned. The user interface 402 also includes a logo 412 corresponding to either the provider of the SDK or to an application (e.g. a messaging application) provided by the provider of the SDK. Also included are a front/rear camera flip icon 414 and a flash-enable icon 416 with which the user can interact to swap between a front and rear camera and to enable different flash modes as is known in the art. The user interface 402 also includes a close and return icon 418 on which the user can tap or swipe downward to dismiss the user interface 402 and return to a user interface provided by the app 110.

In the second example of FIG. 4, as shown in user interface 404, upon selection of a particular AR content generator icon, which now occupies the central position 410, AR effects 420 are rendered for display on the client device 106 in conjunction with the camera feed. In this example, the AR effects 420 includes a 3D object (e.g., a garland of roses as shown) and any other effects that are defined by the AR content generator corresponding to the selected AR content generator icon. Effects may include particle-based effects that are rendered spatially and that move in response to sensor information (e.g., gyroscopic data, and the like) on the viewer's electronic device (e.g., the client device 106). Effects can also include color filtering and shader effects, which can or may also move in response to the sensor information. Examples of coloring filtering include a daylight effect that matches a time of day for a location corresponding to where a message is created (e.g., based on included location metadata with the message). Examples of shader effects include, but are not limited to liquid moving around the screen, glimmer effects, bloom effects, iridescent effects, text effects, changing the background based on movement, etc.

Also provide in the user interface 404 is a carousel return icon 424, which, when touched by the user, returns to the no-AR-content-generator-active state and display of user interface 402.

Figure 5:
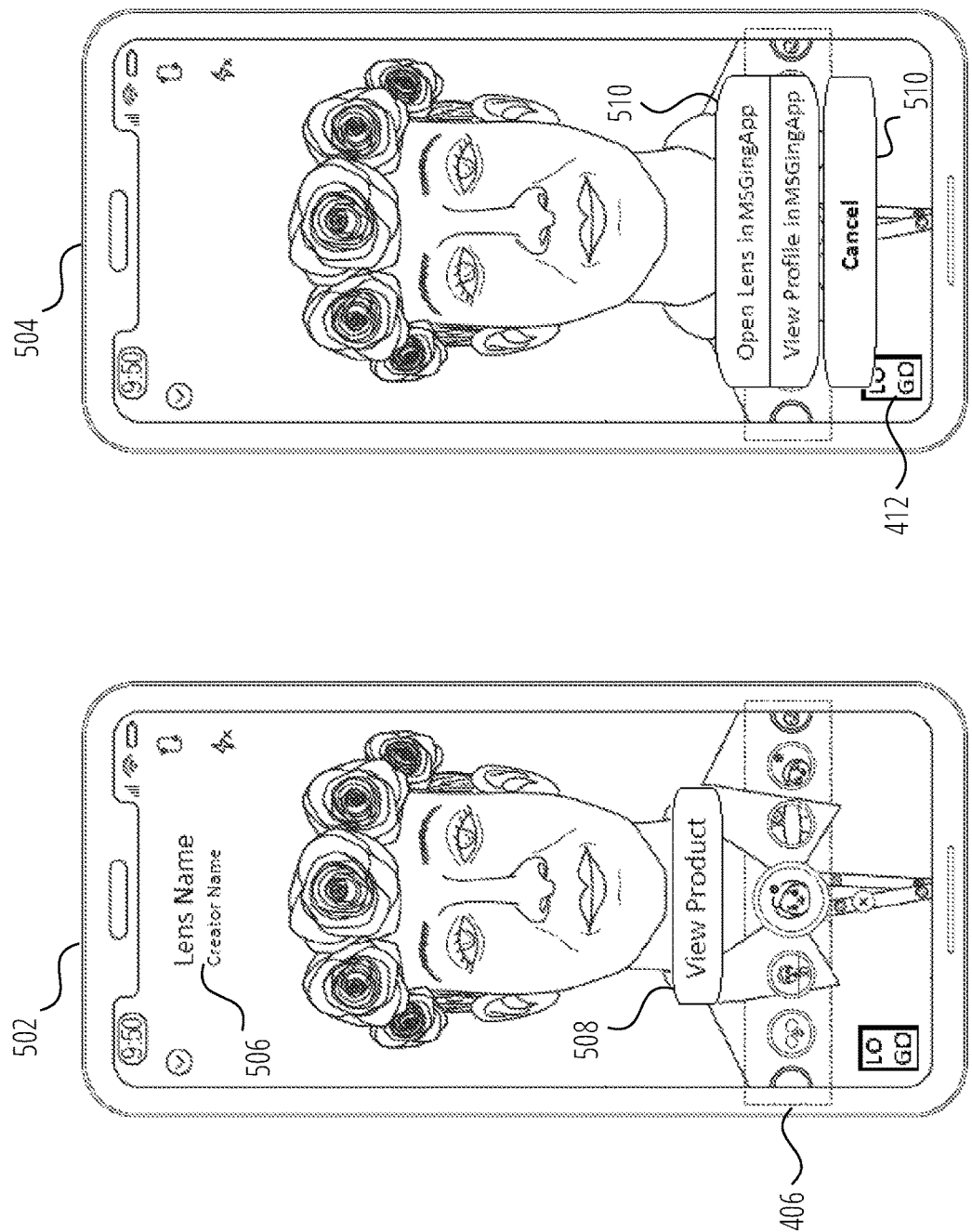
FIG. 5 shows example user interfaces depicting optional features that may be provided to the user interfaces of FIG. 4.

FIG. 5 illustrates example user interfaces depicting optional features that may be provided in the contemplated user interface. In user interface 502, a text overlay 506 is provided that shows the name of the active AR content generator and/or the name of the its creator. Tapping the creator name allows the creator's profile to be viewed on an application (e.g. a messaging application) provided by the provider of the SDK. In addition, a product action UI element 508 may be provided for display and use by the developer of the app 110. The contents of this element and the consequences of tapping it may be customized by the developer of the app 110. For example, it may contain a product name and a link to a web-page or to another part of the app 110 relating to the product.

User interface 504 may be displayed if the logo 412 is tapped. Tapping this logo provides a response that is related to the provider of the SDK or that is related to an app or service provided by same. In this example, tapping on the logo 412 results in dialog boxes 510 being presented to the user. In the illustrated example, the user of the app 110 is provided with a choice of opening a messaging application in its default view with the AR content generator active or to view the app developer's profile in the messaging application. The profile to be viewed when choosing the latter option may be set by the developer, and could for example also be the AR content generator creator's profile. Also included is a cancel button, which will return the user interface to the previous interface, for example user interface 404 or user interface 502.

Figure 6:
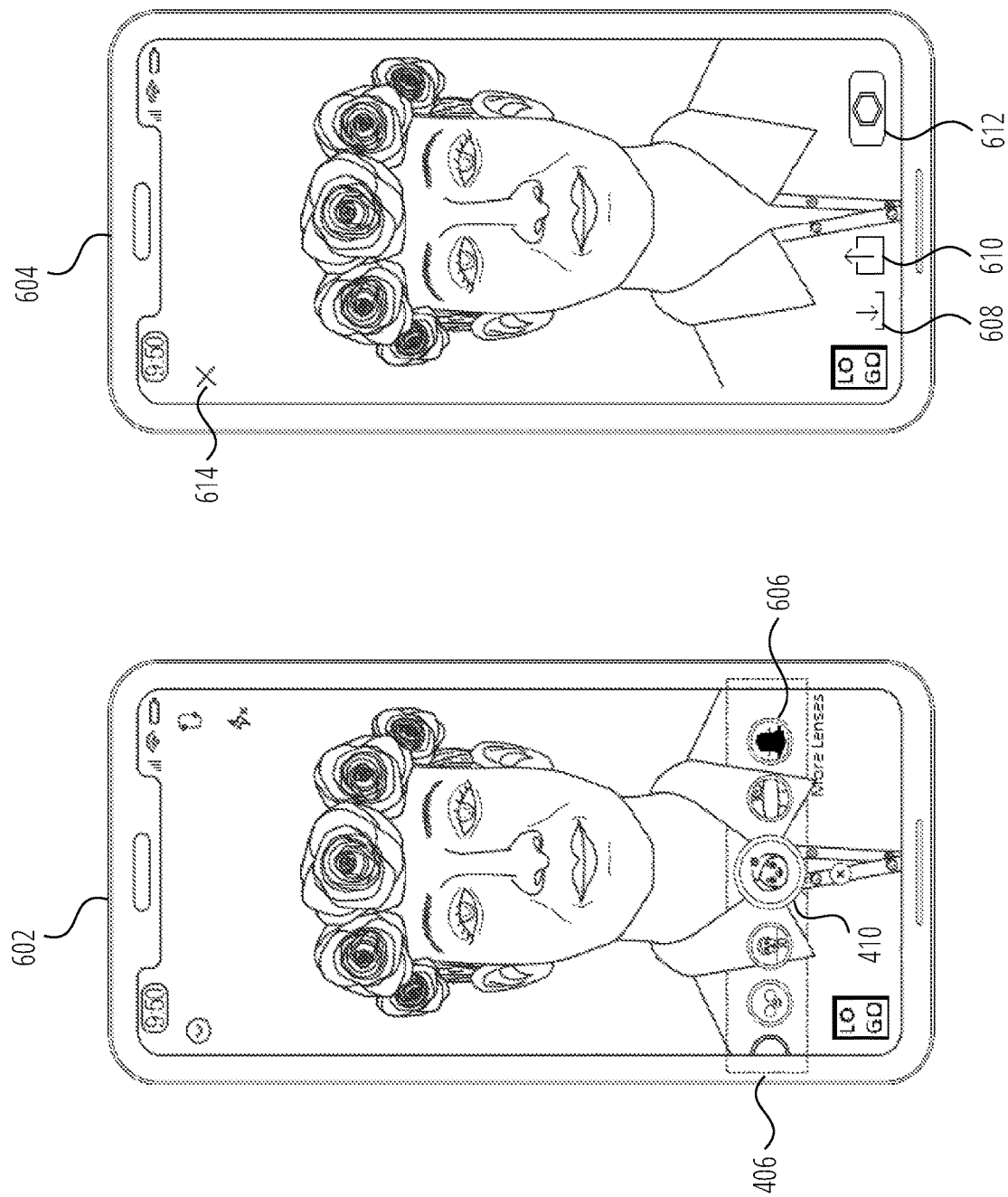
FIG. 6 shows example user interfaces that may result from further user actions with the user interfaces of FIG. 4 and FIG. 5.

FIG. 6 illustrates example user interfaces that may result from further user actions. In user interface 602, the user of the app 110 has scrolled the carousel 406 to the left until there are no more available AR content generators to be shown. In such a case, a logo icon 606 is shown as the final option, with the text "More LENSES" underneath. Tapping the logo icon 606 takes the user to a repository of additional AR content generators that can be used, for example at an app store or in an application (e.g. a messaging application) or AR content generator store provided by the provider of the SDK. Whether or not the logo icon 606 is displayed at the end of the carousel 406 may also depend on various parameters than can be defined by the developer of the SDK and/or the developer of the app. For example, it may be specified that the logo icon 606 only applies to carousels having more than 10 AR content generators. In one example, the carousel 406 does not permit further scrolling to the left after the final icon (logo icon 606 in user interface 602) has appeared in the carousel 406. Alternatively, further scrolling to the left by the user will continue the carousel 406 at the first icon in the carousel, at the central position 410, or return to the user interface 402.

User interface 604 is an example of an interface that is shown after the user takes action to capture the enhanced camera feed, for example by tapping on the central position 410 when an AR content generator is active to capture an image, or by pressing and holding the central position 410 when an AR content generator is active to record a video clip. Once this user action has been completed, a representation of the modified and captured image or video clip is shown in user interface 604. The user can save the image or video clip to local data storage 210 by tapping on save icon 608, or the user can open a dialog box that provides various options for forwarding the image or video clip, as is known in the art, by tapping on the forward icon 610.

Additionally, an app action icon 612 can be provided, with resulting steps that have been defined by the developer of the app 110. For example, the user interface may return to the app's user interface where the captured image or video clip may be used or integrated with the app experience, or otherwise shared on the app platform or with other users of the app 110. The user interface 604 also includes dismiss icon 614, which discards the captured video clip or image and returns to the previous user interface, e.g. user interface 404, user interface 502 or user interface 602.

Figure 7:
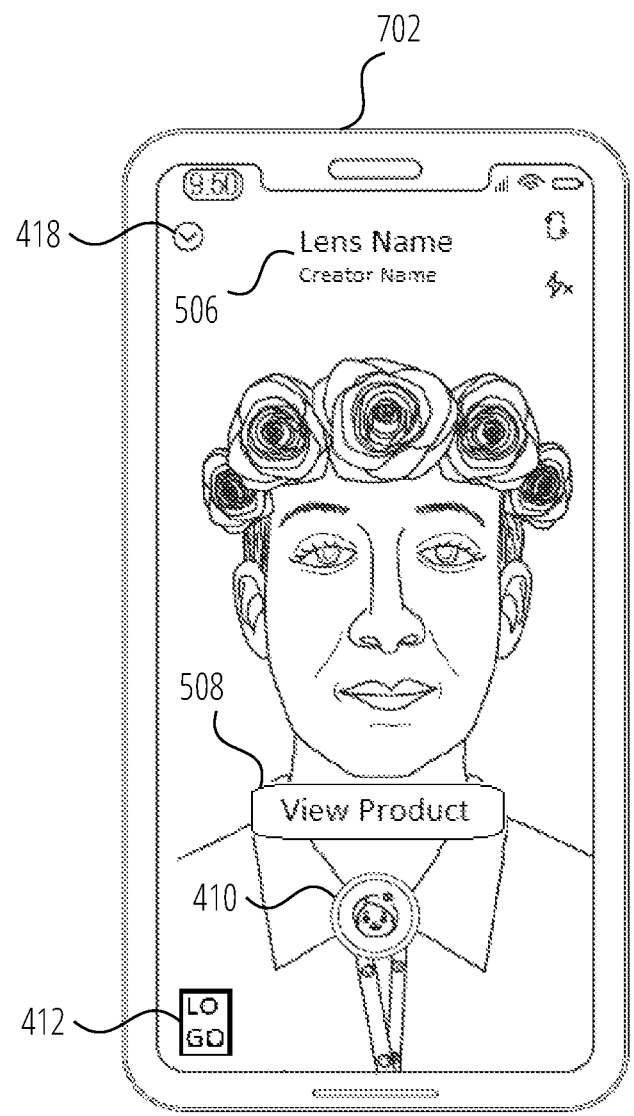
FIG. 7 shows a user interface that may be displayed if there is only one available AR content generator.

FIG. 7 shows a user interface that may be displayed if there is only one available AR content generator when the SDK 216 is called by the app logic 202. In such a case, the user interface 702 may present immediately with the single AR content generator active and the associated AR content generator icon in the central position 410. In this case, the carousel 406 and the carousel return icon 424 need not be shown since there is only one AR content generator that is active by default. Other user interface features will or may be provided as needed or preferred and as specified by the app developer, including text overlay 506, product action UI element 508, logo 412 and close and return icon 418. Interacting with these features will provide the same responses as discussed above.

Figure 8:
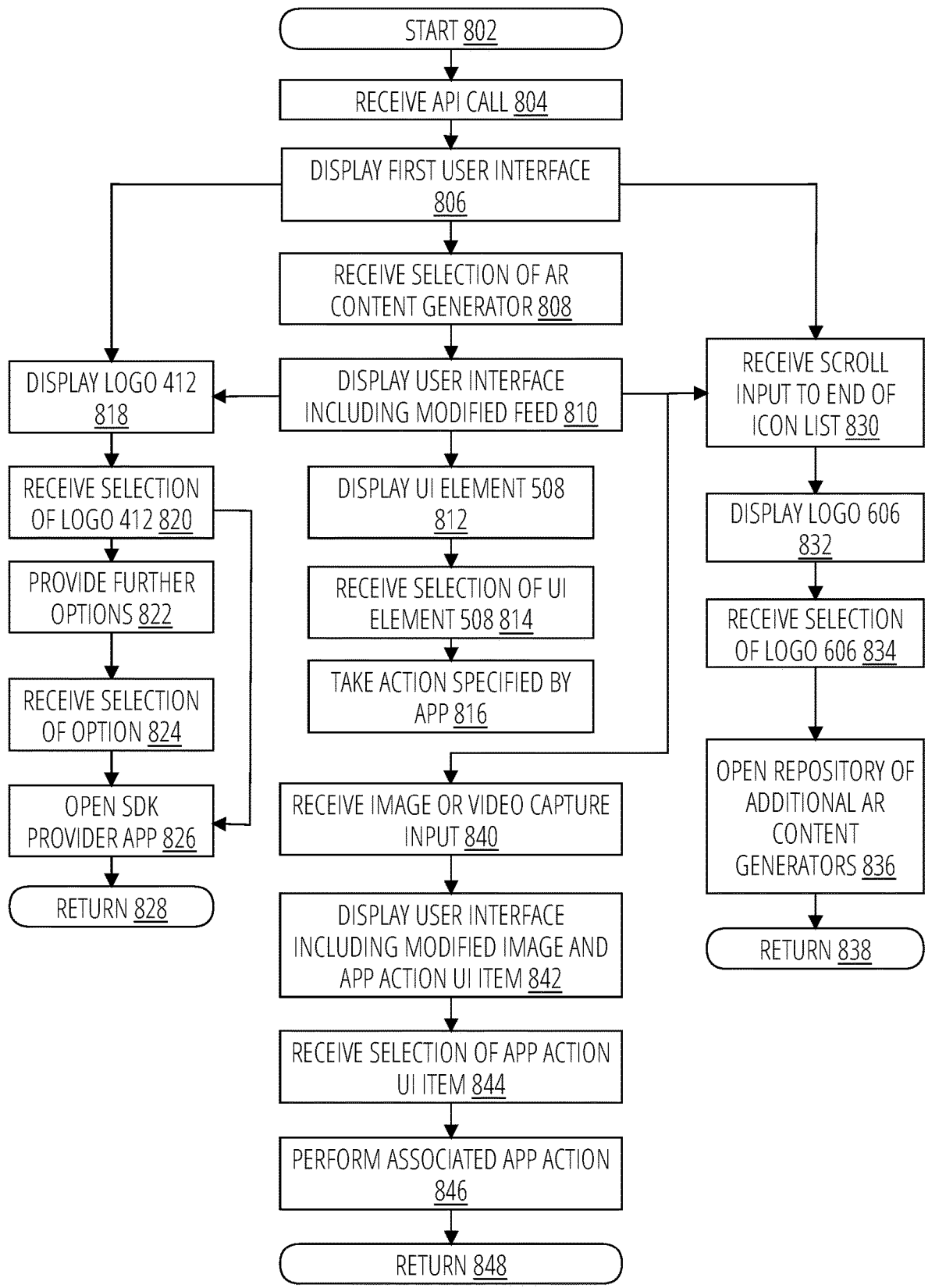
FIG. 8 is a flowchart illustrating example methods for navigating the user interfaces of FIGS. 4-7.

FIG. 8 is a flowchart illustrating example methods for navigating the user interfaces of FIGS. 4-7. The method commences after start operation 802 at operation 804 when the API 204 receives a call from the app logic 202 to provide image enhancement by the SDK 216. In response, the SDK UI 218 generates and displays user interface 402 at operation 806. The user then navigates the carousel 406 and selects an AR content generator icon 408, 422 etc. corresponding to a desired AR content generator. Navigation of the carousel 406 in response to user input (e.g. left/right scrolling, selection of buttons or action items etc. by the user) and the resulting display of an updated user interface (e.g. as shown and described with reference in FIGS. 4 to 7) is performed by the SDK UI 218.

Upon receipt by the SDK 216 of the selection of an AR content generator at operation 808, SDK kit logic 206 obtains the AR content generator, either from local data storage 210 if the AR content generator has been downloaded or precached, or over network 102 from the SDK server system 104 or other server hosting the AR content generator. The SDK kit logic then provides the annotation system 208 with the AR content generator and any associated data, such as device configuration and tracking models. The annotation system 208 then processes the camera feed based on the selected AR content generator and its metadata, the configuration of the device, specified tracking models, user input and sensor (e.g. positional sensor data) or other data received from or via the app logic 202, to generate and display at operation 810 (in conjunction with the SDK UI 218), the user interface 404 including a camera feed that has been modified as defined by the selected AR content generator and associated data. Coordination between the SDK UI 218, the annotation system 208, the local data storage 210 and any remote servers is managed by the SDK kit logic 206.

Alternatively, if the user does not select an AR content generator icon in the carousel 406 at operation 806 and operation 808, but instead scrolls to the end of the carousel, the method continues from operation 830.

From operation 810, the product action UI element 508 and logo 412 and may be provided for display at operation 812 or operation 818 respectively, by the SDK UI 218, if so defined in the selected AR content generator or as specified in an API call from the app logic 202. If selection of the logo 412 is received at operation 820, further options are displayed by the SDK UI 218 at operation 822, as shown in user interface 504 and as described above with reference to FIG. 5. Receipt of selection of an option (other than "Cancel") at operation 824 results in the SDK 216 opening an app (e.g. a messaging application) provided by the SKD provider at operation 826 in the state specified by the selected option. Alternatively, upon receipt of selection of the logo 412 at operation 820, the SDK 216 may open the app provided by the SKD provider at operation 826 directly.

At operation 828, upon return from the app that was opened in operation 826 (for example upon receipt of user interaction closing or dismissing the opened app), a user interface of the app 110 may be displayed. Alternatively, the SDK UI 218 may display user interface 402 or user interface 404 and the method may then continue at either operation 806 or operation 808 respectively.

At operation 814, if a selection of a product action UI element 508 is received in response to operation 812, the action associated with this UI element, as defined by the app developer, is performed at operation 816. Upon completion of this action, the app 110 may return to user interface 402 or user interface 404, or to an app-specific user interface.

If at either operation 806 or operation 810, user input corresponding to scrolling to the end of the carousel is received as at operation 830, the final icon in the carousel, logo icon 606, is displayed by the SDK UI 218 at operation 832. If selection of the logo icon 606 is received at operation 834, a repository of additional AR content generators that is available for use or selection by the user is opened at operation 836. This may be accomplished for example by the SDK 216 providing a call to an app store, or an application (e.g. a messaging application) or AR content generator store provided by the provider of the SDK. User selection of additional AR content generators will result in icons corresponding to the additional AR content generators being included by the SDK UI 218 in the carousel 406. After obtaining or declining additional AR content generators, at operation 838 the method may return and user interface 402 or user interface 404 may be displayed, and the method may then continue at either operation 806 or operation 810 respectively.

Additionally, from operation 810, an image or video capture input may be received at operation 840. In response, the SDK UI 218 may display user interface 604 at operation 842, including presenting the save icon 608, forward icon 610, app action icon 612 and dismiss icon 614. If selection of the app action icon 612 is received at operation 844, action(s) that have been defined by the developer of the app 110 are performed at operation 846. For example, a user interface defined by app logic 202 may be presented, where the captured image or video clip may be used or integrated with the app experience, or otherwise shared on the app platform or with other users of the app 110. In the event that there is a return to the method at operation 848 from the app action performed in operation 846 in response to user input, the method proceeds at one of the user interfaces, e.g. user interface 402, user interface 404 or user interface 502 for example.

Machine Architecture

Figure 9:
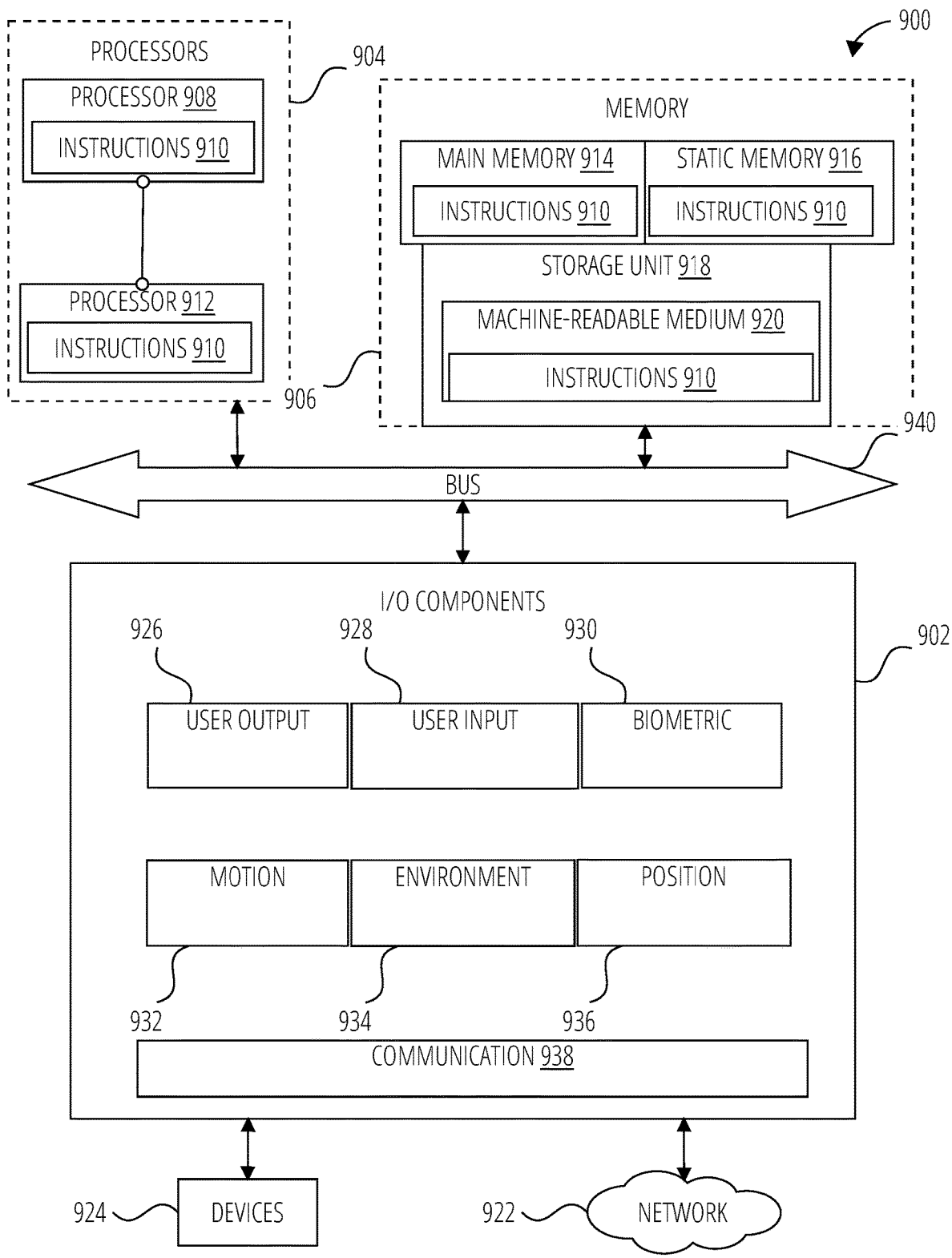
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of the machine 900 within which instructions 910 (e.g., software, a program, an application, an applet, an app, or other executable code) for causing the machine 900 to perform any one or more of the methodologies discussed herein may be executed. For example, the instructions 910 may cause the machine 900 to execute any one or more of the methods described herein. The instructions 910 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 910, sequentially or otherwise, that specify actions to be taken by the machine 900. Further, while only a single machine 900 is illustrated, the term "machine" shall also be taken to include a collection of machines that individually or jointly execute the instructions 910 to perform any one or more of the methodologies discussed herein. The machine 900, for example, may comprise the client device 106 or any one of a number of server devices forming part of the SDK server system 104. In some examples, the machine 900 may also comprise both client and server systems, with certain operations of a particular method or algorithm being performed on the server-side and with certain operations of the particular method or algorithm being performed on the client-side.

The machine 900 may include processors 904, memory 906, and input/output I/O components 902, which may be configured to communicate with each other via a bus 940. In an example, the processors 904 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 908 and a processor 912 that execute the instructions 910. The term "processor" is intended to include multi-core processors that may comprise two or more independent processors (sometimes referred to as "cores") that may execute instructions contemporaneously. Although FIG. 9 shows multiple processors 904, the machine 900 may include a single processor with a single-core, a single processor with multiple cores (e.g., a multi-core processor), multiple processors with a single core, multiple processors with multiples cores, or any combination thereof.

The memory 906 includes a main memory 914, a static memory 916, and a storage unit 918, both accessible to the processors 904 via the bus 940. The main memory 906, the static memory 916, and storage unit 918 store the instructions 910 embodying any one or more of the methodologies or functions described herein. The instructions 910 may also reside, completely or partially, within the main memory 914, within the static memory 916, within machine-readable medium 920 within the storage unit 918, within at least one of the processors 904 (e.g., within the Processor's cache memory), or any suitable combination thereof, during execution thereof by the machine 900.

The I/O components 902 may include a wide variety of components to receive input, provide output, produce output, transmit information, exchange information, capture measurements, and so on. The specific I/O components 902 that are included in a particular machine will depend on the type of machine. For example, portable machines such as mobile phones may include a touch input device or other such input mechanisms, while a headless server machine will likely not include such a touch input device. It will be appreciated that the I/O components 902 may include many other components that are not shown in FIG. 9. In various examples, the I/O components 902 may include user output components 926 and user input components 928. The user output components 926 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 928 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 902 may include biometric components 930, motion components 932, environmental components 934, or position components 936, among a wide array of other components. For example, the biometric components 930 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 932 include acceleration sensor components (e.g., accelerometer), gravitation sensor components, rotation sensor components (e.g., gyroscope).

The environmental components 934 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 106 may have a camera system comprising, for example, front cameras on a front surface of the client device 106 and rear cameras on a rear surface of the client device 106. The front cameras may for example, be used to capture still images and video of a user of the client device 106 (e.g., "selfies"), which may then be augmented with augmentation data (e.g., filters) described above. The rear cameras may for example, be used to capture still images and videos in a more traditional camera mode, with these images similarly being augmented with augmentation data. In addition to front and rear cameras, the client device 106 may also include a 360° camera for capturing 360° photographs and videos.

Further, the camera system of a client device 106 may include dual rear cameras (e.g., a primary camera as well as a depth-sensing camera), or even triple, quad or penta rear camera configurations on the front and rear sides of the client device 106. These multiple cameras systems may include a wide camera, an ultra-wide camera, a telephoto camera, a macro camera and a depth sensor, for example.

The position components 936 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 902 further include communication components 938 operable to couple the machine 900 to a network 922 or devices 924 via respective coupling or connections. For example, the communication components 938 may include a network interface Component or another suitable device to interface with the network 922. In further examples, the communication components 938 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 924 may be another machine or any of a wide variety of peripheral devices (e.g., a peripheral device coupled via a USB).

Moreover, the communication components 938 may detect identifiers or include components operable to detect identifiers. For example, the communication components 938 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 938, such as location via Internet Protocol (IP) geolocation, location via Wi-Fi® signal triangulation, location via detecting an NFC beacon signal that may indicate a particular location, and so forth.

The various memories (e.g., main memory 914, static memory 916, and memory of the processors 904) and storage unit 918 may store one or more sets of instructions and data structures (e.g., software) embodying or used by any one or more of the methodologies or functions described herein. These instructions (e.g., the instructions 910), when executed by processors 904, cause various operations to implement the disclosed examples.

The instructions 910 may be transmitted or received over the network 922, using a transmission medium, via a network interface device (e.g., a network interface component included in the communication components 938) and using any one of several well-known transfer protocols (e.g., hypertext transfer protocol (HTTP)). Similarly, the instructions 910 may be transmitted or received using a transmission medium via a coupling (e.g., a peer-to-peer coupling) to the devices 924.

Software Architecture

Figure 10:
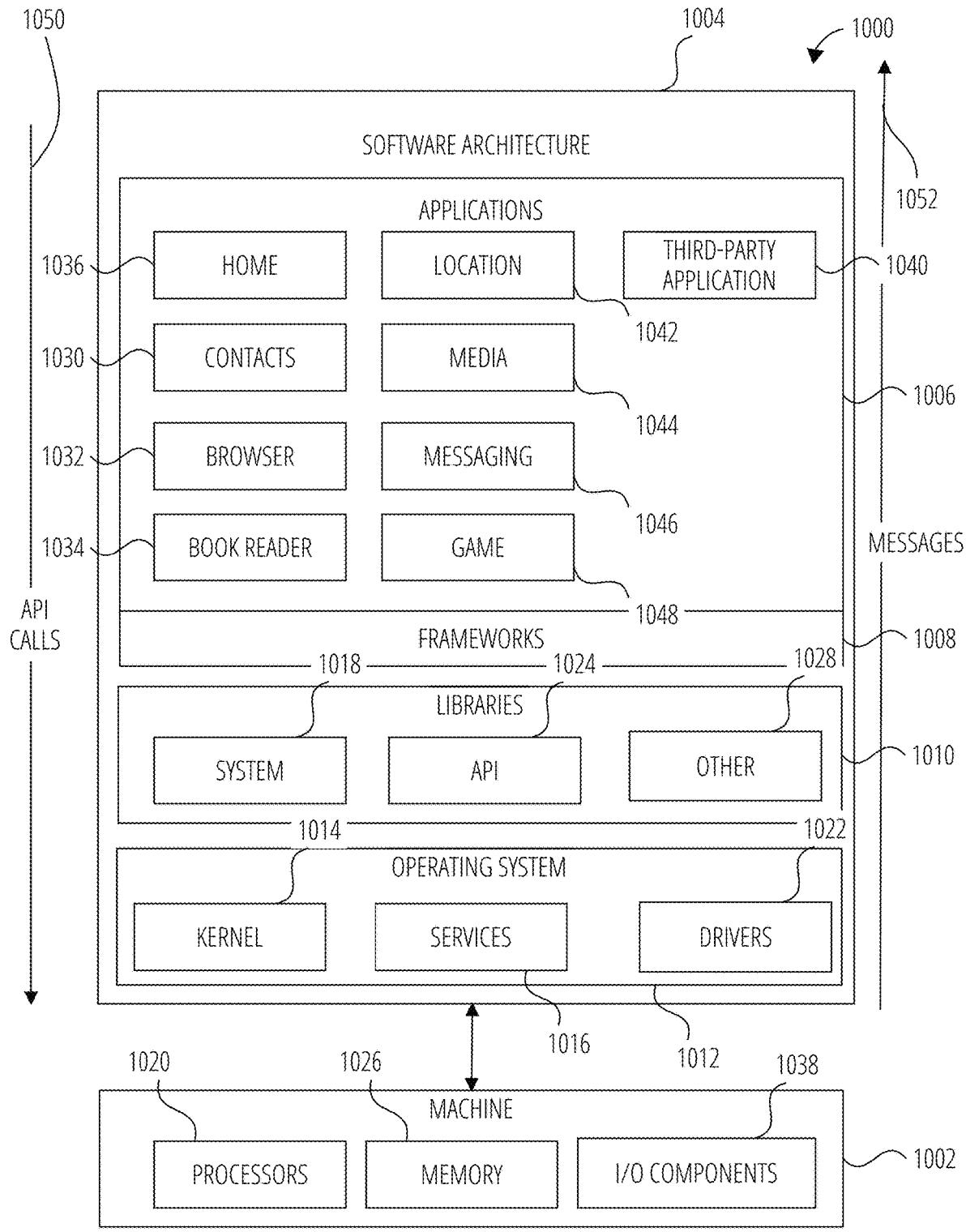
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006. Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by the applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as a third-party application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the third-party application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1040 can invoke the API calls 1050 provided by the operating system 1012 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1020 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

The invention claimed is:

1. A method of providing a user interface on a device including a camera and a display, comprising:
  receiving, by a software development kit (SDK), a program call to display an image processing user interface in a third party application that utilizes the SDK;
  displaying on the display of the device, a first user interface comprising a plurality of selectable graphical items corresponding to respective image modification features provided by the SDK;
  receiving user selection of an individual graphical item from the plurality of selectable graphical items;
  applying image modification features corresponding to the individual graphical item to an image received from the camera thereby to generate a modified image;
  displaying, on the display of the device, a second user interface including the modified image and a logo related to a provider of the SDK;
  receiving user selection of the logo; and
  in response to receiving user selection of the logo, opening an application that is provided by a provider of the SDK,
  wherein the second user interface further comprises a product user-interface element, selection of which provides information relating to a product specified by a developer of the third party application.

2. The method of claim 1, wherein the application is opened to a profile of a creator of the image modification features corresponding to the individual graphical item.

3. The method of claim 1, wherein the application is opened to a profile of the provider of the third party application that utilizes the SDK.

4. The method of claim 1, wherein the application is opened to a third user interface that provides further selectable graphical items corresponding to respective image modification features.

5. The method of claim 1, wherein the second user interface further comprises a text overlay including a name of a creator of the image modification features corresponding to the individual graphical item.

6. The method of claim 1, wherein the second user interface further comprises a user interface element that is customizable by the developer of the third party application that utilizes the SDK and which, when selected, results in an action related to the third party application or related to the developer of the third party application.

7. A system comprising:
one or more processors of a machine;
a camera;
a display; and
a memory storing instructions that when executed by at least one processor among the one or more processors, causes the machine to perform operations comprising:
receiving, by a software development kit (SDK), a program call to display an image processing user interface in a third party application that utilizes the SDK;
displaying on the display of the system, a first user interface comprising a plurality of selectable graphical items corresponding to respective image modification features provided by the SDK;
receiving user selection of an individual graphical item from the plurality of selectable graphical items;
applying image modification features corresponding to the individual graphical item to an image received from the camera thereby to generate a modified image;
displaying, on the display of the system, a second user interface including the modified image and a logo related to a provider of the SDK;
receiving user selection of the logo; and
in response to receiving user selection of the logo, opening an application that is provided by a provider of the SDK,
wherein the second user interface further comprises a product user-interface element, selection of which provides information relating to a product specified by a developer of the third party application.

8. The system of claim 7, wherein the application is opened to a profile of a creator of the image modification features corresponding to the individual graphical item.

9. The system of claim 7, wherein the application is opened to a profile of the provider of the third party application that utilizes the SDK.

10. The system of claim 7, wherein the application provided by the provider of the SDK is opened to a third user interface that provides further selectable graphical items corresponding to respective image modification features.

11. The system of claim 7, wherein the second user interface further comprises a text overlay including a name of a creator of the image modification features corresponding to the individual graphical item.

12. The system of claim 7, wherein the second user interface further comprises a user interface element that is customizable by the developer of the third party application that utilizes the SDK, and which, when selected, results in an action related to the third party application or related to the developer of the third party application.

13. A non-transitory machine-readable storage medium embodying instructions that, when executed by a portable device including a camera and a display, cause the portable device to perform operations comprising:
receiving, by a software development kit (SDK), a program call to display an image processing user interface in a third party application that utilizes the SDK;
displaying on the display of the portable device, a first user interface comprising a plurality of selectable graphical items corresponding to respective image modification features provided by the SDK;
receiving user selection of an individual graphical item from the plurality of selectable graphical items;
applying image modification features corresponding to the individual graphical item to an image received from the camera thereby to generate a modified image;
displaying, on the display of the portable device, a second user interface including the modified image and a logo related to a provider of the SDK;
receiving user selection of the logo; and
in response to receiving user selection of the logo, opening an application that is provided by a provider of the SDK,
wherein the second user interface further comprises a product user-interface element, selection of which provides information relating to a product specified by a developer of the third party application.

14. The non-transitory machine-readable storage medium of claim 13, wherein the application is opened to a profile of a creator of the image modification features corresponding to the individual graphical item.

15. The non-transitory machine-readable storage medium of claim 13, wherein the application is opened to a profile of the provider of the third party application that utilizes the SDK.

16. The non-transitory machine-readable storage medium of claim 13, wherein the application provided by the provider of the SDK is opened to a third user interface that provides further selectable graphical items corresponding to respective image modification features.

17. The non-transitory machine-readable storage medium of claim 13, wherein the second user interface further comprises a user interface element that is customizable by the developer of the third party application that utilizes the SDK, and which, when selected, results in an action related to the third party application or related to the developer of the third party application.

* * * * *